(12) United States Patent
Chang et al.

(10) Patent No.: US 10,810,245 B2
(45) Date of Patent: Oct. 20, 2020

(54) HYBRID METHOD OF BUILDING TOPIC ONTOLOGIES FOR PUBLISHER AND MARKETER CONTENT AND AD RECOMMENDATIONS

(71) Applicant: Adobe Inc., San Jose, CA (US)

(72) Inventors: Walter Chang, San Jose, CA (US); Minhoe Hur, Incheon (KR); Geoff Baum, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 606 days.

(21) Appl. No.: 13/743,492

(22) Filed: Jan. 17, 2013

(65) Prior Publication Data

US 2014/0201185 A1 Jul. 17, 2014

(51) Int. Cl.
*G06F 16/35* (2019.01)
*G06F 16/951* (2019.01)
*G06F 16/36* (2019.01)

(52) U.S. Cl.
CPC .......... *G06F 16/367* (2019.01); *G06F 16/951* (2019.01)

(58) Field of Classification Search
CPC .. G06F 16/367; G06F 16/951; G06F 16/9535; G06F 16/2228; G06F 16/285; G06F 16/282; G06F 16/9566; G06F 40/30
USPC ........... 707/600–831, 899, 999.001–999.206
See application file for complete search history.

(56) References Cited

U.S. PATENT DOCUMENTS

| | | | | |
|---|---|---|---|---|
| 7,644,052 B1* | 1/2010 | Chang | .................... | G06N 5/022 706/45 |
| 2003/0177112 A1* | 9/2003 | Gardner | ........................... | 707/3 |
| 2004/0249801 A1* | 12/2004 | Kapur | ................... | G06F 16/951 |
| 2008/0215519 A1* | 9/2008 | Runge | ................... | G06F 17/271 706/47 |
| 2009/0216696 A1* | 8/2009 | Downs | .............. | G06F 17/30675 706/20 |
| 2010/0114561 A1* | 5/2010 | Yasin | .................... | G06F 40/216 704/9 |
| 2010/0217742 A1* | 8/2010 | Labrou et al. | .................. | 706/50 |
| 2011/0004578 A1* | 1/2011 | Momma | .............. | G06N 99/005 706/12 |

(Continued)

OTHER PUBLICATIONS

Drineas, P., Mahoney, M. W., & Muthukrishnan, S. (2008). Relative-error CUR matrix decompositions. SIAM Journal on Matrix Analysis and Applications, 30(2), 844-881.*

(Continued)

*Primary Examiner* — Angelica Ruiz
(74) *Attorney, Agent, or Firm* — Kilpatrick Townsend & Stockton LLP

(57) ABSTRACT

Systems and methods are discussed to automatically create a domain ontology that is a combination of ontologies. Some embodiments include systems and methods for developing a combined ontology for a website that includes extracting collocations for each webpage within the website, creating first and second ontologies from the collocations, and then aggregating the ontologies into a combined ontology. Some embodiments of the invention include unique ways to calculate collocations, to develop a smaller yet meaningful document sample from a large sample, to determine webpages of interest to users interacting with a website, and to determine topics of interest of users interacting with a website. Various other embodiments of the invention are disclosed.

18 Claims, 10 Drawing Sheets

(56) References Cited

U.S. PATENT DOCUMENTS

| | | | |
|---|---|---|---|
| 2011/0040717 A1* | 2/2011 | Rho et al. | 706/50 |
| 2011/0196861 A1* | 8/2011 | Egnor et al. | 707/723 |
| 2011/0225159 A1* | 9/2011 | Murray | G06F 17/30713 |
| | | | 707/739 |
| 2012/0078595 A1* | 3/2012 | Balandin et al. | 703/6 |
| 2013/0055076 A1* | 2/2013 | Assadollahi | G06F 17/30014 |
| | | | 715/256 |
| 2013/0212060 A1* | 8/2013 | Crouse | G06F 16/254 |
| | | | 707/602 |
| 2014/0172417 A1* | 6/2014 | Monk et al. | 704/9 |

OTHER PUBLICATIONS

Mahoney, Michael W., and Petros Drineas. "CUR matrix decompositions for improved data analysis." Proceedings of the National Academy of Sciences (2009): pnas-0803205106. (Year: 2009).*

* cited by examiner

| | | | | | |
|---|---|---|---|---|---|
| 1 | Chicken | 49 | 2.67 | 38 | learn | 4 | 0.22 |
| 2 | recipe | 34 | 1.85 | 39 | international cuisines | 4 | 0.22 |
| 3 | rating | 30 | 1.63 | 40 | international | 4 | 0.22 |
| 4 | Bon Appetit | 21 | 1.14 | 41 | guide | 4 | 0.22 |
| 5 | Bon | 21 | 1.14 | 42 | food | 4 | 0.22 |
| 6 | Appetit | 21 | 1.14 | 43 | episode video series | 4 | 0.22 |
| 7 | User | 17 | 0.93 | 44 | episode video | 4 | 0.22 |
| 8 | recipe rating | 15 | 0.82 | 45 | episode | 4 | 0.22 |
| 9 | User rating | 15 | 0.82 | 46 | epicurious | 4 | 0.22 |
| 10 | Recipes | 15 | 0.82 | 47 | cuisine | 4 | 0.22 |
| 11 | Gourmet | 12 | 0.65 | 48 | White | 4 | 0.22 |
| 12 | Cooking | 12 | 0.65 | 49 | Vogue | 4 | 0.22 |
| 13 | Recipe | 9 | 0.49 | 50 | Salsa | 4 | 0.22 |
| 14 | Video | 8 | 0.44 | 51 | Salad | 4 | 0.22 |
| 15 | Favorite | 8 | 0.44 | 52 | Roast | 4 | 0.22 |
| 16 | > | 6 | 0.33 | 53 | Rice | 4 | 0.22 |
| 17 | Tips | 6 | 0.33 | 54 | Jerk Chicken | 4 | 0.22 |
| 18 | October | 6 | 0.33 | 55 | Jerk | 4 | 0.22 |
| 19 | Nast | 6 | 0.33 | 56 | January | 4 | 0.22 |
| 20 | Grilled | 6 | 0.33 | 57 | Golf | 4 | 0.22 |
| 21 | Epicurious | 6 | 0.33 | 58 | Digest | 4 | 0.22 |
| 22 | Cooking Tips | 6 | 0.33 | 59 | Chili | 4 | 0.22 |
| 23 | Conde Nast | 6 | 0.33 | 60 | Beans | 4 | 0.22 |
| 24 | Conde | 6 | 0.33 | 61 | Bean | 4 | 0.22 |
| 25 | 2005 | 6 | 0.33 | 62 | 2012 | 4 | 0.22 |
| 26 | tip | 5 | 0.27 | 63 | 2007 | 4 | 0.22 |
| 27 | site | 5 | 0.27 | 64 | 2005 User rating | 4 | 0.22 |
| 28 | chicken | 5 | 0.27 | 65 | 2005 User | 4 | 0.22 |
| 29 | August | 5 | 0.27 | 66 | top-rated | 3 | 0.16 |
| 30 | 2008 | 5 | 0.27 | 67 | newsletter | 3 | 0.16 |
| 31 | & | 5 | 0.27 | 68 | article & guides | 3 | 0.16 |
| 32 | video series international | 4 | 0.22 | 69 | article & | 3 | 0.16 |
| 33 | video series | 4 | 0.22 | 70 | article | 3 | 0.16 |
| 34 | video | 4 | 0.22 | 71 | View | 3 | 0.16 |
| 35 | series international cuisines | 4 | 0.22 | 72 | Vietnamese | 3 | 0.16 |
| 36 | series international | 4 | 0.22 | 73 | Simple | 3 | 0.16 |
| 37 | series | 4 | 0.22 | 74 | Recipes tips | 3 | 0.16 |

*Figure 7*

HYBRID METHOD OF BUILDING TOPIC ONTOLOGIES FOR PUBLISHER AND MARKETER CONTENT AND AD RECOMMENDATIONS

FIELD

This disclosure relates generally to website ontology creation and use.

BACKGROUND

A website ontology is an organized hierarchy of categories that cover the topics present on the webpages of a website. The speed of website development and content creation makes acquiring and using such topics difficult. Without some type of topic structure, online users, marketers, and publishers have difficulty acquiring information from websites by keyword based search or painstakingly traversing numerous webpages until they find what they are looking for. Publishers face the daunting task of categorizing all the contents of their websites from different sources by hand, which can be time consuming and inaccurate, especially for large websites. For online marketers looking to strategically place an ad on the web, they often must read all the webpages within a website to find the most appropriate slots to place advertisements. The growing depth of online content along with the time it takes to properly develop an ontology presents challenges to publishers, marketers and users alike.

SUMMARY

Systems and methods are discussed to automatically create a domain ontology that is a combination of ontologies. Some embodiments include systems and methods for developing a combined ontology for a website that includes extracting collocations for each webpage within the website, creating first and second ontologies from the collocations, and then aggregating the ontologies into a combined ontology. Some embodiments of the invention may include unique ways to calculate collocations, to develop a smaller yet meaningful document sample from a large sample, to determine webpages of interest to users interacting with a website, and to determine topics of interest of users interacting with a website. Various other embodiments of the invention are disclosed.

Embodiments of the invention may also include a computer program product comprising a non-transitory computer-readable medium embodying code executable by a computing system that may include: program code that receives a URL for a website; program code that identifies the webpages within the website; program code that extracts collocations for each webpage within the website; program code that creates a first ontology from the lexical and semantic analysis of the collations; program code that creates a second ontology from the statistical analysis of the collocations; and program code that aggregates the first ontology and the second ontology into a combined ontology.

Embodiments of the invention may also include a computing system that includes a processor, a database, and a non-transitory computer-readable medium. The non-transitory computer-readable embodying program components that may configure the computing system to perform a number of steps. These steps can include, for example, receiving a URL for a website, crawling the website and storing the text of the webpages into the database, extracting collocations for each webpage, creating a first ontology from the semantic collocations, creating a second ontology from the statistical collocations, and aggregating the first ontology and the second ontology into a combined ontology.

Embodiments of the invention may include a method for selecting a subset of webpages from a website. The method may include organizing the content of the webpages in the website into a domain matrix A with rows representing each webpage within the website and columns representing words within each webpage. A matrix C can be created from the columns of the domain matrix A. Each column of matrix C can have a high probability of being representative of all columns of the domain matrix A. A matrix R can also be created from the rows of the domain matrix A. Each row of matrix R can have a high probability of being representative of all rows of the domain matrix A. A matrix U can be calculated using CUR matrix decomposition, and the product of matrix C, matrix U, and matrix R can be returned. In some embodiments the rows of matrix A can represent a webpage record, and the columns can represent topics or words in the webpage.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

FIG. 7 shows an example of an n-gram list created from a webpage describing the best chicken recipes.

DETAILED DESCRIPTION

Systems and methods are disclosed to automatically construct or extend topic ontologies for documents within a domain to include multiple ontologies in a single combined ontology. Such ontologies are an organized hierarchy of categories that cover the topics present in the documents within a domain. These ontologies can be determined using a number of different techniques. A domain can include any collection of content such as, for example, a library of documents or webpages within a website. Embodiments of the invention can be used, for example, to develop either a single ontology or an aggregated ontology for webpages within a website using a computer system with little or no user interaction except the input of the webpage URL and/or other initialization parameters. Embodiments of the invention can help users, publishers, and/or marketers analyze website content by organizing content topics. Content and/or ads can then be recommended for a selected segment of consumers using embodiments of the invention. Moreover, embodiments of the invention can also be used to improve website searching.

A website ontology can be created in a number of ways. For example, a website ontology can be created by tagging parts-of-speech in each webpage of the website and then extracting collocation from the terms (collocation extraction is described in more detail below). Any number of statistic and/or semantic analysis can then be performed on the collocations to create an ontology. In some embodiments more than one ontology can be created using different statistic and/or semantic tools and aggregated into a combined ontology. These ontologies can then be used in a number of different ways.

For example, a marketer may want to place an ad on the internet for an indoor grill. The marketer would like to place the ad on a webpage that focuses on chicken recipes. One approach would be to have the marketer find cooking and/or recipe websites and manually search through the webpages to identify appropriate webpages to place the ad. This can be time consuming, subject to the searching skills of the marketer, and/or limited based on the amount of time the marketer has to search the website.

Alternatively, the marketer can use embodiments of the invention to develop website ontologies of various cooking and/or recipe websites of interest. From these domain ontologies, the marketer can quickly identify webpages that include these topics. Moreover, embodiments of the invention can also provide information about which webpages within the website are of interest to visitors to the website. In this way the marketer can select webpages for placing the ad based on topics of interest and/or based on having been shown to be of interest to users.

Figure 1:
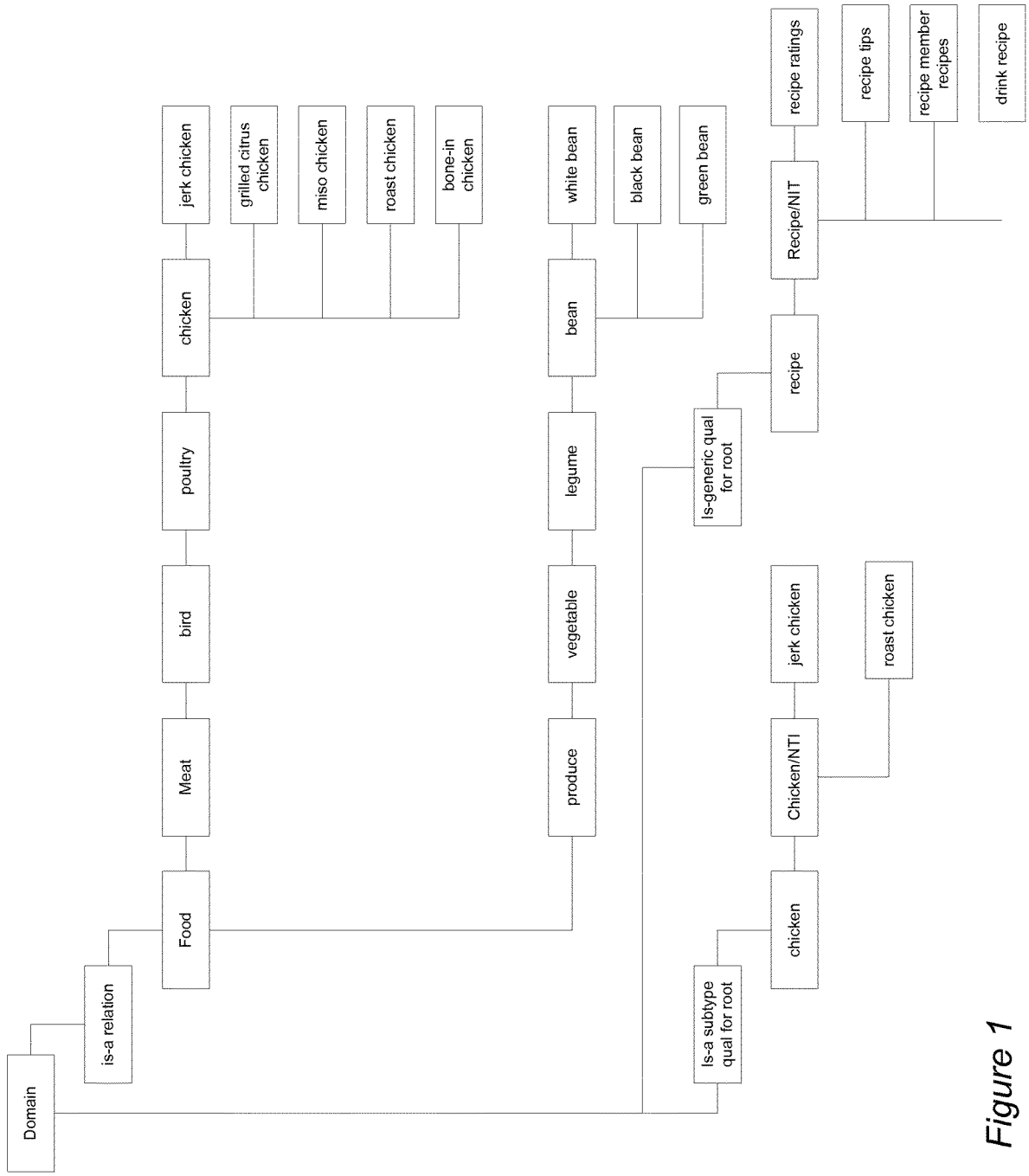
FIG. 1 is an example of a combined ontology according to some embodiments of the invention.

FIG. 1 is an example of a combined ontology snapshot developed using embodiments of the invention. In this example, three ontologies are combined to create the aggregated ontology. These include an is-a relationship ontology, is-a subtype ontology, and is-generic ontology. A subtype ontology, for example, may use an external classification taxonomy that is not necessarily a lexicon ontology or may leverage semantic relationships beyond lexicon hypernyms. An is-generic qualification for root can indicate that the root term (e.g. recipe) is being used to qualify another term or concept (e.g., ratings or tips). For example, "Drink recipe" should be deleted or replaced with "Recipe review" since "Drink recipe" is-a recipe. Each of these sub-ontologies includes different information about the document and/or domain.

Some embodiments of the invention describe ontology creation for webpages within a website. These embodiments can be extended to ontology creation for any set of documents within a domain.

Figure 2:
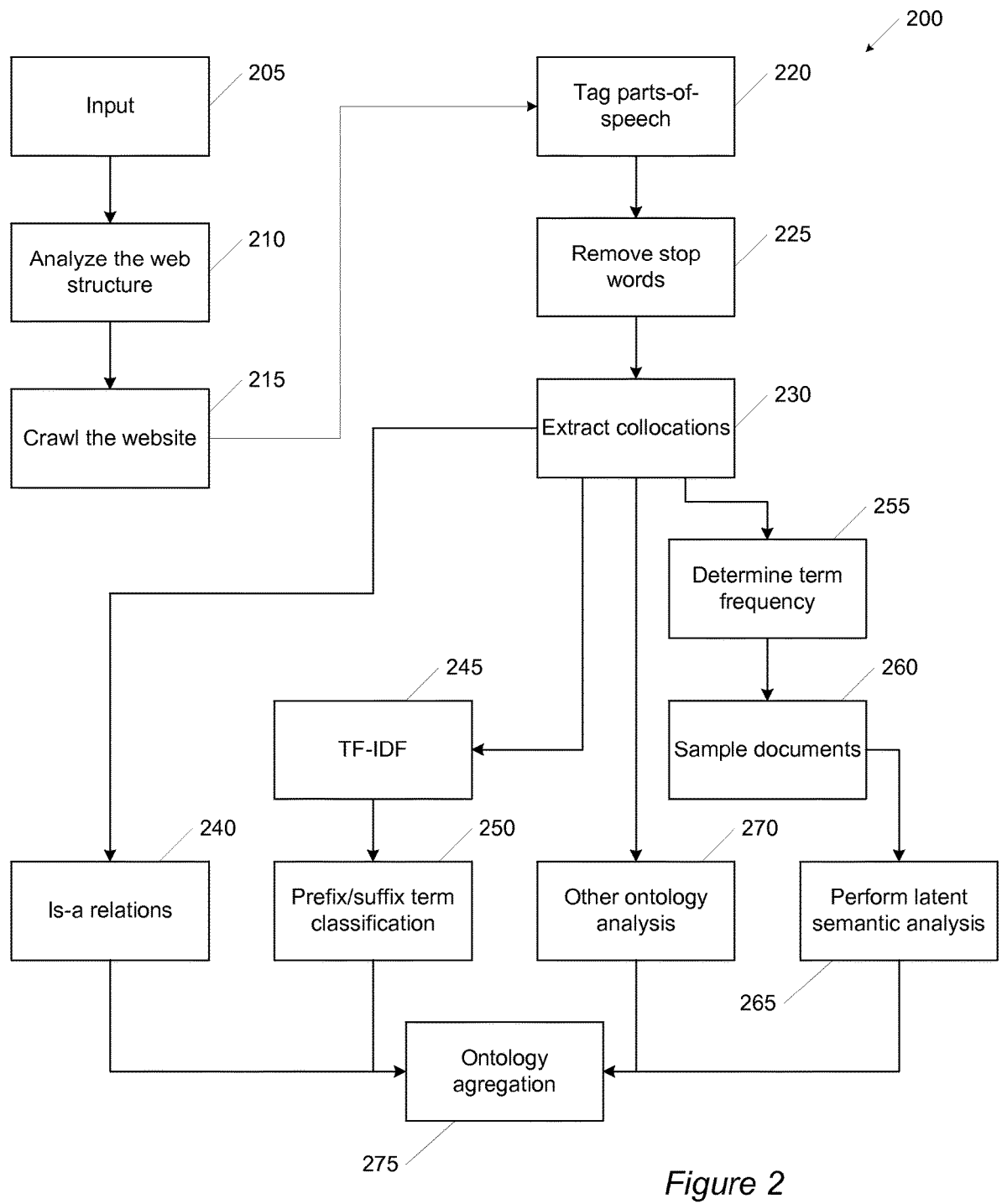
FIG. 2 is a flowchart of a method for determining a combined ontology according to some embodiments of the invention.

FIG. 2 shows a flowchart of method 200 for developing a website ontology for a website. Method 200 starts at block 205 with website data being input. In some embodiments this data can include the URL or URL(s) associated with the website, the depth of the search, stop words, and/or a white/black list. The depth of the search can indicate how deep into the identified website the data should be searched. For example, specific categories, URLs, documents, media types, etc. can be indicated as excluded. The stop words can include words or phrases as a list or as individual words that should not be returned as part of the ontology development. The white/black list can include URL keywords to include or not include within the website search.

The data received at block 205 can be analyzed at block 210 to determine the structure of the website. All the webpages in the website associated with the URL can be traversed and the structure of the webpage can be returned. By specifying the depth of the site to be traversed, users can limit the depth of the web structure to be crawled (see below) and analyzed. Block 210 can return a list of URLs in the website.

In some embodiments, the web structure can be analyzed using URL keywords. The white/black list can be used to determine which words can/cannot be put into a URL. For example, for a URL to recipes and blogs on a food website, the black list may include "video" and the white list can include "beef". In this way all webpages with "video" in the URL will not be returned and all recipes and blogs mentioning "beef" will be returned.

In some embodiments only the new or revised webpages can be identified. For example, if the website had been previously analyzed, then new webpages or revised webpages can be identified and added to the list of URLs.

At block 215 the website can be crawled and the webpages associated with the URL saved to a local disk. In some embodiments block 215 may only crawl the URLs in the listing returned from the web structure analysis in block 210. In some embodiments only the text from the webpages can be saved. The web crawler can limit the depth of the crawling based on the depth of the search input at block 205. In some embodiments, the web crawler can read and partition the list of generated URLs received from the block 210. The web crawler can then output a webpage request list from the prior stage and launch multiple processes to perform multiple parallel webpage fetches to retrieve all requested webpages until there are no more webpages to fetch and analyze. The web crawler can return one or more text files listing the text found on the webpages identified in block 210

In some embodiments if a website has been previously crawled, then only the new or revised webpages may be crawled.

At block 220 text contained in sampled webpages can be annotated with part-of-speech tags. In some embodiments the text within the sampled webpages can be analyzed and POS tags for each word and/or for each noun/verb expression can be tagged in the text. This can be done, for example, based on either or both of a word's definition and the context within which it used. POS tagging can utilize any algorithm, program, application, or routine known in the art to perform POS tagging without limitation. Text data can be returned with POS tagged within the text.

At block 225 stop words can be removed. At this block any stop words indicated in block 205 can be removed from the list. These can be input as individual words, as a list of words, or as a file having a list of words. A search through the words returned from the page sampler module (if used) or the web crawler can be used to identify and remove stop words.

At block 230 collocations can be extracted to identify sequences of words or terms that have a statistically significant co-occurrence or co-occur more often than would be expected by chance. A collocation is an expression consisting of two or more words that correspond to some conventional way of saying things. The following are examples of collocations: "strong tea", "make up", "graphic art", and "the rich and powerful".

Figure 4:
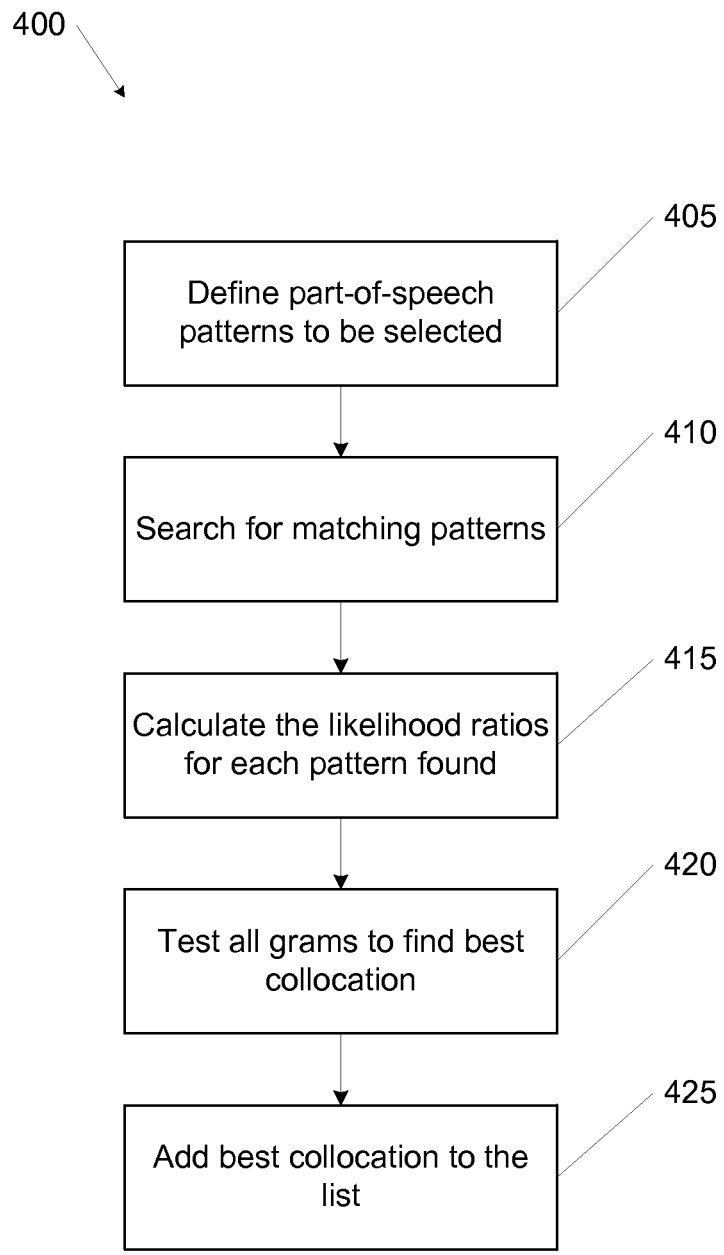
FIG. 4 is a flowchart of a method for calculating collocations of a document according to some embodiments of the invention.

The collocation extraction can return a collocation phrase as well as a collocation value that expresses how interesting or meaningful the collocation is within the document. Any number of processes (e.g., TFIDF) can be used to identify these sequences of words. In some embodiments a threshold collocation value can be used to filter out collocations that are not interesting or meaningful. FIG. 4 shows an example of a flow chart that can be used to determine collocations, which is discussed in detail below.

After block 230, method 200 can split to determine four different ontologies. While four are shown, any number of ontologies can be used. Moreover, while these are shown processing in parallel, they can also operate in series.

Figure 3:
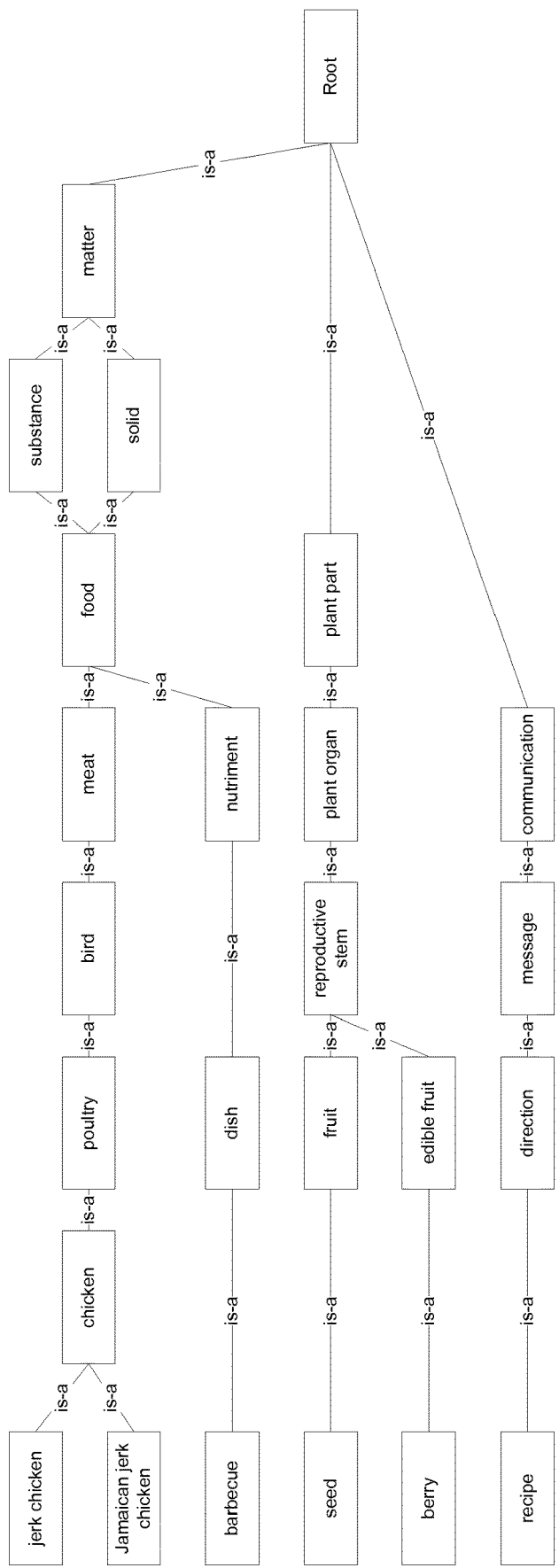
FIG. 3 shows an example of an is-a relation tree for a jerk chicken recipe according to some embodiments of the invention.

At block 240 is-a relations can be found among words in the collocation list. Is-a relations can infer the relationships among words. Using the words in the collocation list, an is-a relation can be created. An example of an is-a relation tree for a jerk chicken recipe is shown in FIG. 3. Each recipe word on the left has a more generalized relationship with other words. For instance, "jerk chicken" can be followed across the tree. "Jerk chicken" is-a type of "chicken", which is-a "poultry". "Poultry" is-a "bird", which is-a "meat". "Meat" is-a "food", which is both a "substance" and "solid", both of which are "matter".

In some embodiments the is-a relations can be inferred using the open domain WordNet relationship data. Other semantic relationship data or tools can be used other than WordNet. Collocations can be linked to the WordNet relationship data or other is-a relation data using method 500 shown in FIG. 5, which is discussed in detail below.

At block 245 a term frequency-inversed document frequency (TF-IDF) list can be created. TF-IDF is a numerical statistic that can reflect how important a word is to a document in a domain, or, in this example, how important a word is to a webpage within a website. A TF-IDF value increases proportionally with the number of times a word appears in the webpage, but is offset by the frequency of the word occurring in the website, which helps to compensate for the fact that some words are generally more common than others. For example, TF-IDF returns words with a high frequency of use within a webpage but having a low distribution of use among the webpages within a website.

TF-IDF can be the product of two statistics: term frequency and inverse document frequency. There are a number of ways of calculating these values. The term frequency, for example, can be calculated by counting the number of times a term is used in a document. The term frequency can be calculated from the raw frequency of a term occurring within a document. Other possibilities can include the Boolean frequency which produces a one or a zero depending on whether a word exists or not. As another example, the frequency can be a logarithmically scaled frequency. As yet another example, a normalized frequency can be used, which can prevent a bias towards longer documents. This can be calculated from the raw frequency divided by the maximum raw frequency of any term in the document.

The inverse document frequency is a measure of whether the term is common or rare across all webpages. It can be obtained, for example, by dividing the total number of webpages by the number of webpages containing the term, and then taking the logarithm of that quotient. Various other techniques can be used to determine the inverse document frequency.

At block 250 prefix/suffix relationships can be identified from the words in the TF-IDF list. Terms from the TF-IDF list with similar prefixes and/or suffixes can be clustered. In some embodiments, an n-gram algorithm can be used to cluster these terms. Such an algorithm can identify any prefixes and/or suffixes to determine the root word. If the root word is identified in the TF-IDF list, then the statistical measure of the root word can be revised with the statistical measure of the word with the prefix and/or suffix.

At block 255, using the collocation list found at block 230, the term frequency of the collocations can be calculated for each webpage. The term frequency can be calculated as noted above.

At block 260 specific webpages can be sampled to cut down on processing demands. In some embodiments block 255 may be skipped for websites with a limited number of webpages. For example, for websites with less than 100,000 webpages, sampling may not be needed. Various thresholds can be used. In such situations the sampled webpages can include all the webpages. In some embodiments the sampled webpages can be selected based on whether the webpages are the most similar to the other webpages or the most meaningful webpages in the website.

By sampling the website only certain webpages are used in later steps. Doing this can reduce processing time and/or save on storage space requirements. In some embodiments a user can specify the percentage of webpages sampled. In some embodiments a user can specify that a specific webpage or webpages (or URL(s)) be included within the sample. In some embodiments CUR decompositions can be used to sample the webpages as described in more detail in conjunction with FIG. 6.

The sampling can be tested to ensure that the sample is statistically meaningful. For example, each website can be compared with all the webpages in the website or the webpages already selected using either or both the Jaccard index and/or the Kullback-Leibler divergence. Both measures return a value between 1 and 0. The Jaccard index indicates the similarity of two sample sets. A high Jaccard coefficient indicates a high likelihood of similarity. The Kullback-Leibler divergence is a measure of the difference between two probability distributions. A high Kullback-Leibler divergence between webpages indicates a low likelihood of similarity.

At block 265 a latent semantic analysis can be performed using the sampled webpage data from block 260 and/or the term frequency data from block 255. At this block terms that have similar semantic meanings can be determined. Because of the size of some websites, this analysis could take a long time. Thus, latent semantics can be performed using CUR matrix decomposition. To do so, a matrix having webpages as the columns and collocation terms as the rows can be constructed and then the CUR matrix decomposition followed, for example as described below in conjunction with FIG. 6.

At block 270 another ontology analysis can be performed. This analysis can be performed using, for example, the collocations found in block 230. These other ontologies can be developed using such tools as SVD/PCA, Clustering, and/or Naïve Bayes. One such ontology can include grouping ranked collocations by their occurrence on pages in particular sections of the website.

At block 275 all the relationships determined previously can be aggregated and combined into a combined ontology. While four ontologies are used to create this combined ontology, any number of ontologies can be used. The output can include the ontologies produced above in from blocks 240, 250, 265, and 270.

FIG. 4 shows a flowchart of method 400 for determining collocations within a document according to some embodiments of the invention. The collocations can be found by filtering text using part-of-speech patterns and/or likelihood ratios. At block 405 part-of-speech patterns can be defined. These part-of-speech patterns can include any relationship between nouns, verbs, adjectives, prepositions, adverbs, etc. The following table is an example of eight part-of-speech patterns that can be used. In the table "N" refers to a noun, "A" refers to an adjective, and "P" refers to a preposition. In some embodiments the part-of-speech patterns can be defined previously and coded into an algorithm or software to be used by the next block.

| Tag Patterns | | | Example |
| --- | --- | --- | --- |
| N | | | Restaurant |
| A | N | | Top-rated recipe |
| N | N | | Cuisine guide |
| A | A | N | New year's day |
| A | N | N | Crispy street snack |
| N | A | N | St. Patrick's day |
| N | N | N | Celebrity kitchen tour |
| N | P | N | Word of food |

At block 410 the document can be searched for patterns matching the collocations defined in block 405. If the words in the document have been previously tagged for part-of-speech, then these part-of-speech can be compared to find patterns. If not, then, in some embodiments, the part-of-speech can be tagged within a document prior to searching for patterns. A listing of collocations can be returned with an indication for the number of collocations returned.

At block 415, the likelihood ratio for each collocation can be determined. This can be done on the collocation as well as on any gram of the collocation. For example, if the collocation is an N1, N2, N3 collocation, then the likelihood function for the following three collocations can be determined as N1, N2, N3; N1, N2; and N2, N3. For example, the grams of "celebrity kitchen tour" are "celebrity kitchen tour", "celebrity kitchen", and "kitchen tour".

The likelihood ratio for each collocation can be calculated using any technique. For example, the likelihood ratio can be calculated using the following equation:

$$\log \lambda = \log L(c_{12};c_1,p) + \log L(c_2-c_{12};N-c_1,p) - \log L(c_{12};c_1,p_1) - \log L(c_2-c_{12};N-c_1,p_2),$$

where $L(k;n,x) = x^{k_1}(1-x)^{n-k}$ and $c_1$ is the number of occurrences of occurrences of a first word in a collocation, $C_2$ is the number of occurrences of occurrences of a second word in a collocation, and $c_{12}$ are the number of occurrences of occurrences of the collocation of the first word and the second word. N is the number of total collocations and $p_1$ and $p_2$ are the probabilities.

At block 420 the grams making up each collocation can undergo hypothesis testing (or Bayes Factors) to determine the best collocation. For example, the collocation "celebrity kitchen tour" includes two grams: "celebrity kitchen" and "kitchen tour". Based on the likelihood ratios determined in block 415, the collocation of "celebrity kitchen tour", "celebrity kitchen", and "kitchen tour" can be determined. Collocations having four n-grams can have four options for the best n-gram. FIG. 7 shows an example of an n-gram list from a webpage of best chicken recipes where n=3.

At block 425, the best collocations can be added to the list of collocations. If, at block 420, the best collocations are not found, then the collocation and/or n-grams are broken down and the single noun terms can be added to the word list.

Figure 5:
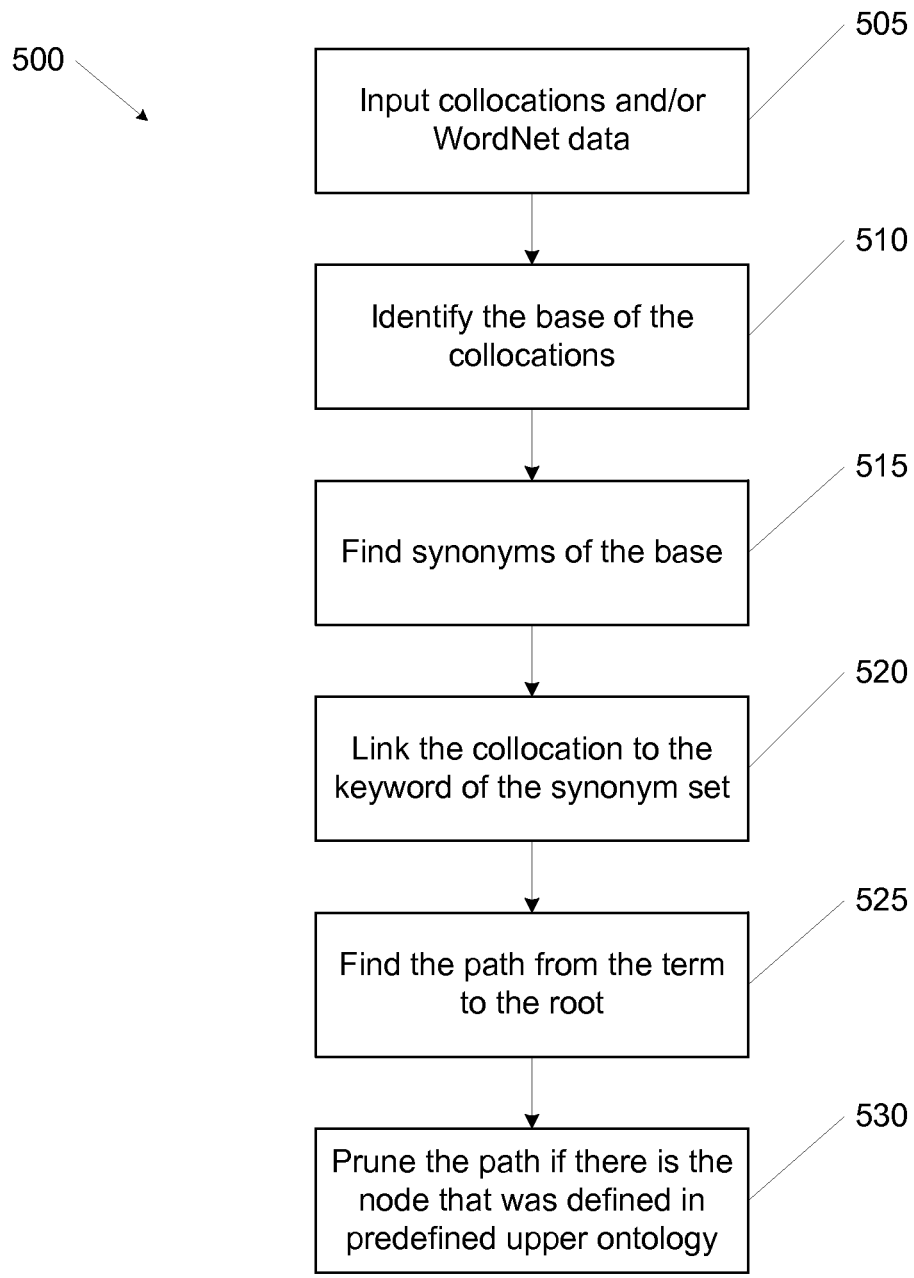
FIG. 5 is a flowchart of a method for using WordNet data with collocations according to some embodiments of the invention.

FIG. 5 is a flowchart of method 500 for using WordNet data with collocations according to some embodiments of the invention. At block 505 collocations and/or WordNet data can be input. While WordNet is used to describe this embodiment of the invention, any synonym relationship data can be used. The base of each collocation can be identified at block 510. In some embodiments this can occur, by looking up the n-grams of each POS tagged collation sequence in a term lexicon (e.g., Wordnet). If nothing is found in the term lexicon, a word can be taken from left to right (or vice versa) from the collocation and the process can be repeated until a base word or root term is found or all words have been exhausted. For example, the base of the collocation "best burger recipe" can be identified as "burger recipe". As another example, the base of "Father's day" is "day", and the base of "episode of Epicurious" is "episode".

At block 515 the synonyms of each collocation base can be identified using WordNet. At block 520 the collocations can be linked to the keyword of the synonym set found in block 515. At block 525 the path from the term to the root can be found; for example, using the Wordnet lexicon hypernym inference path. Finally, at block 530 the path can be pruned if there is the node that was defined in a predefined upper ontology. For example, if an upper ontology has been previously defined to include "food" as a topic category, then the hypernym path returned at block 525 can be truncated at "food" and Broader Term (BT) categories higher up the hierarchy can be discarded.

In some embodiments the result of method 500 can be the is-a relation chart shown in FIG. 3.

Figure 6:
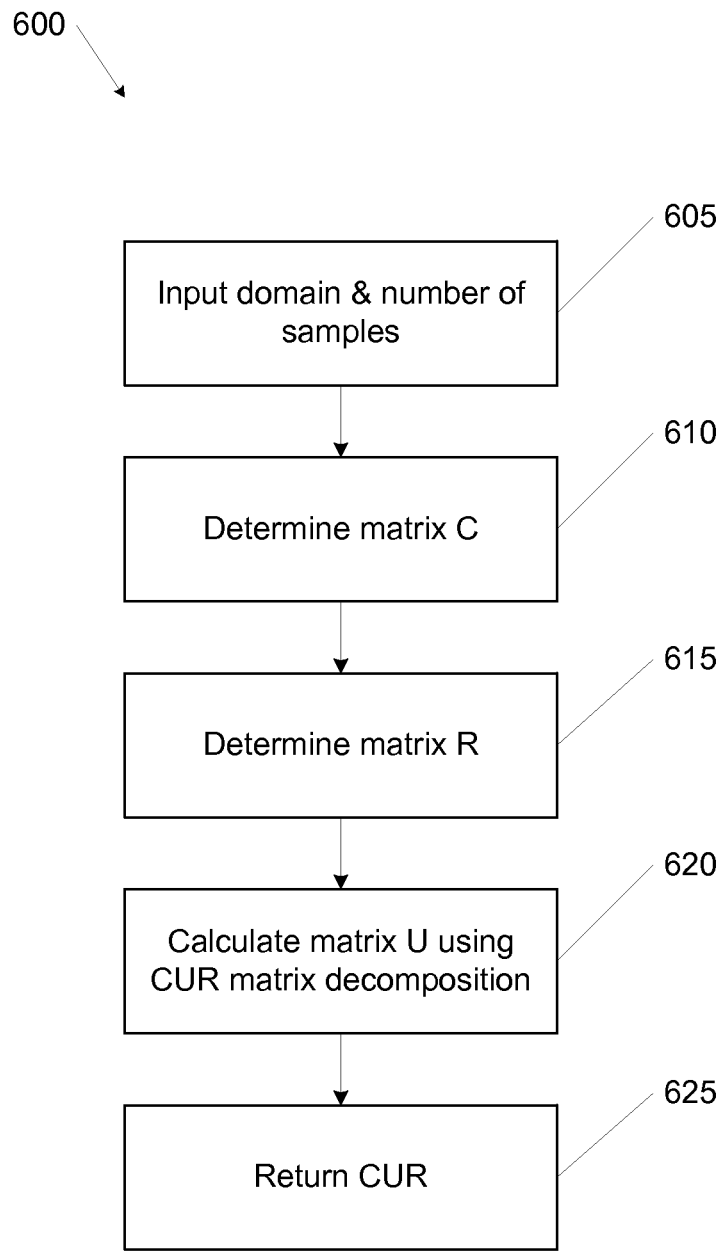
FIG. 6 is a flowchart of a method for calculating a CUR decomposition from documents within a domain.

In some embodiments, CUR matrix decomposition can be used to sample webpages from a large website. While building an ontology from every webpage within an website can produce higher accuracy results and/or broader coverage, such processing for large websites (e.g., larger than 100,000 webpages) can be very time consuming, require a lot of processing power, and/or may be duplicative. A CUR matrix decomposition can be used to reduce the data set size while ensuring that the sampled data reproduces a small data set indicative of the larger data set. FIG. 6 shows a flowchart of method 600 that is an example of CUR matrix decomposition. Other methods can be used such as singular value decomposition (SVD).

Method 600 starts at block 605 where the domain and number of samples are entered. The domain, for example, can be a pointer to a set of documents such as a URL or a link to a folder(s) containing the documents. The number of samples is the size of the desired sampled data set that is output from method 600. The number of samples can include two values—one for the rows and another for the columns of the resultant matrix. The input matrix A can include rows that are actual documents from the domain and columns that represent the words, collocations, etc. within each document.

At block 610 matrix C can be determined from the columns of A having the most importance or most information. This can be done, for example, by first determining an importance metric for each column in A. This can be calculated in any number of ways. For example, the importance metric, π, can be calculated using the following:

$$\pi_j = \frac{1}{k}\sum_{\tau=1}^{k}(v_j^\tau)^2,$$

where $v_j^\tau$ is the $j^{th}$ coordinate of the $\tau^{th}$ right singular vectors, and k is a rank parameter. Using the importance metric, the most important columns can be selected. One example for selecting columns includes a column select function.

The column select function can include the following three steps. First, the top k right singular vectors of A can be computed along with the statistical leverage scores; k is a rank parameter. Second, the $j^{th}$ column of a matrix having a probability of $p_j$=min{1,$c\pi_j$} can be kept, where c=O(k log k/ε$^2$), where, O(n) designates the limiting behavior of a function as the argument, n, increases. Third, the matrix, C, can be returned by keeping only the columns having the probability noted in the second step. Other ways of returning the highest ranked columns of A can be used.

Using CUR decomposition we expect the following to be true:

$$\|A-CUR\|_F \leq (2+\varepsilon)\|A-A_k\|_F,$$

where ε a is an error factor.

At block 615 matrix R can be determined from the rows of A having the most importance or most information. This can be done in a manner similar to how matrix C was determined but using, for example, $A^T$ instead of A.

At block 620, the matrix U can be chosen to ensure that CUR is a close approximation of A. For example, U can be chosen from U=C$^+$ AR$^+$. Where C$^+$ and R$^+$ are the Moore-Penrose generalizations of C and R, respectively. Various other techniques can be used to choose U.

At block 625, CUR can be returned as a close approximation of A but with a smaller dimension.

FIG. 7 shows an example of an n-gram list created from a webpage describing the best chicken recipes. The list is sorted by the number of times each n-gram was used. For this example, n=3. The listing includes the rank, the term (word or phrase), the frequency of use, and the term's statistical score.

Figure 8:
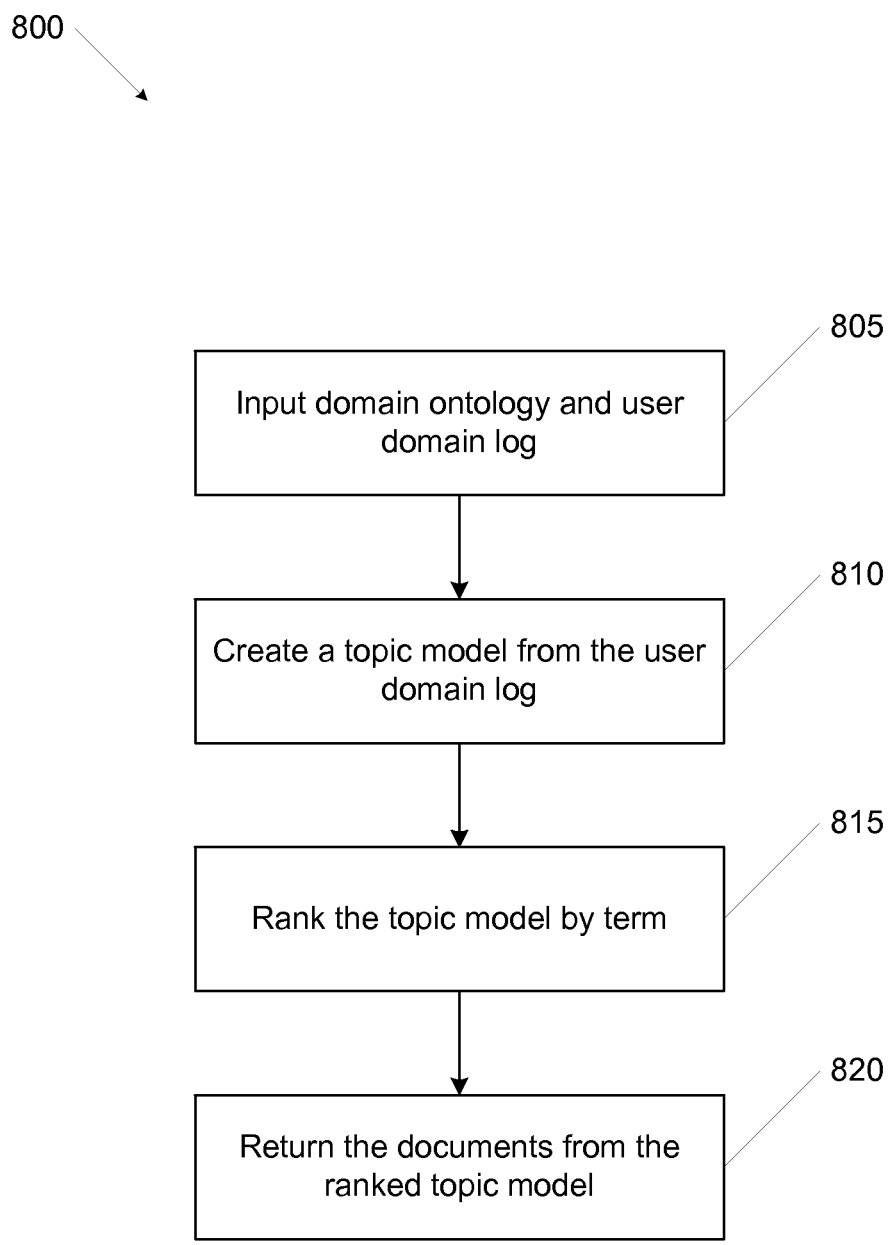
FIG. 8 is a flowchart of a method for determining documents of interest to users interacting with a domain according to some embodiments of the invention.

FIG. 8 is a flowchart of method 800 for determining webpages of interest to users interacting with a website according to some embodiments of the invention. Method 800 can start at block 805 with the domain ontology and the user's URL log being entered into the system. The domain ontology may be one created by aggregating ontologies using the steps outlined above, or may be a provided ontology. The URL log can specify the webpages within the website that were accessed by the user along with other details. The domain ontology can be determined, for example, from the method shown in FIG. 2.

At block 810 for each page that a user visits as indicated by a log entry in the URL log, a topic model can be built for that page using the provided domain ontology. Topic models may be aggregated. The topical model can return the abstract topics that occur within a webpage. Any type of topic model can be used. For example, the topic model can be calculated using probabilistic latent semantic indexing, latent Dirichlet allocation, Pachinko allocation, or any other topic model. The ontologies generated by this invention can be directly used to generate the topic model for each webpage.

At block 815 the topics in the aggregated topic model by score, term frequency, TFIDF, importance, relevance, significance, etc. Importance can be determined, for example, based on the frequency the topic is used within the document or domain.

At block 820, the webpages (e.g., URLS or documents) with the highest scoring topics in the aggregated topic model can be returned. The returned webpages can make up the set of webpages touched by this user. The returned webpages can be used during analytics processing to help a publisher and/or marketer understand which webpages within the website are of interest to the user(s).

Figure 9:
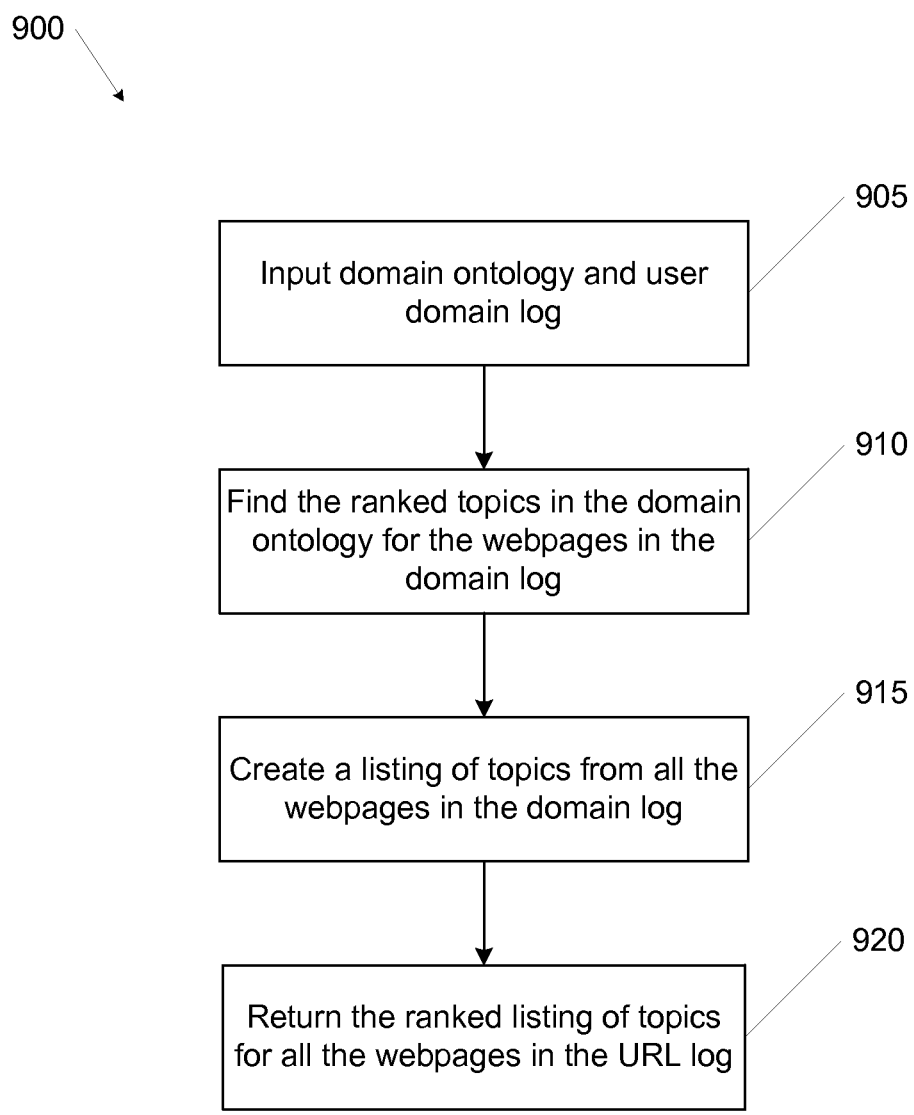
FIG. 9 is a flowchart of a method for determining topics of interest of users according to some embodiments of the invention.

FIG. 9 is a flowchart of method 900 for determining topics of interest of users visiting webpages within a website according to some embodiments of the invention. Method 900 can start at block 905 with the domain ontology and the URL log entered into the system. The URL log can specify the webpages within the website that were accessed by the user. The domain ontology can be determined, for example, from the method shown in FIG. 2.

At block 910, the topics in the topic/page index from webpages listed in the user URL log can be returned for each webpage to indicate the score-ranked topics that were found on the set of webpages viewed by the user. At block 915 a listing of all the topics returned in block 910 can be aggregated into a single listing of topics. This listing can indicate the topics of interest to a specific user (or user segment or user group).

At block 920, this list can be returned. From this list, top level topics (those higher in the ontology) can be used to indicate more general topics of interest. These can be useful for broad recommendations or ad targeting campaigns. Lower level topics (those closer to leaf levels) can be used to indicate more specific topics of interest. These can be useful for more specialized recommendations or ad targeting campaigns based on interest inferences from the lower level topics.

Figure 10:
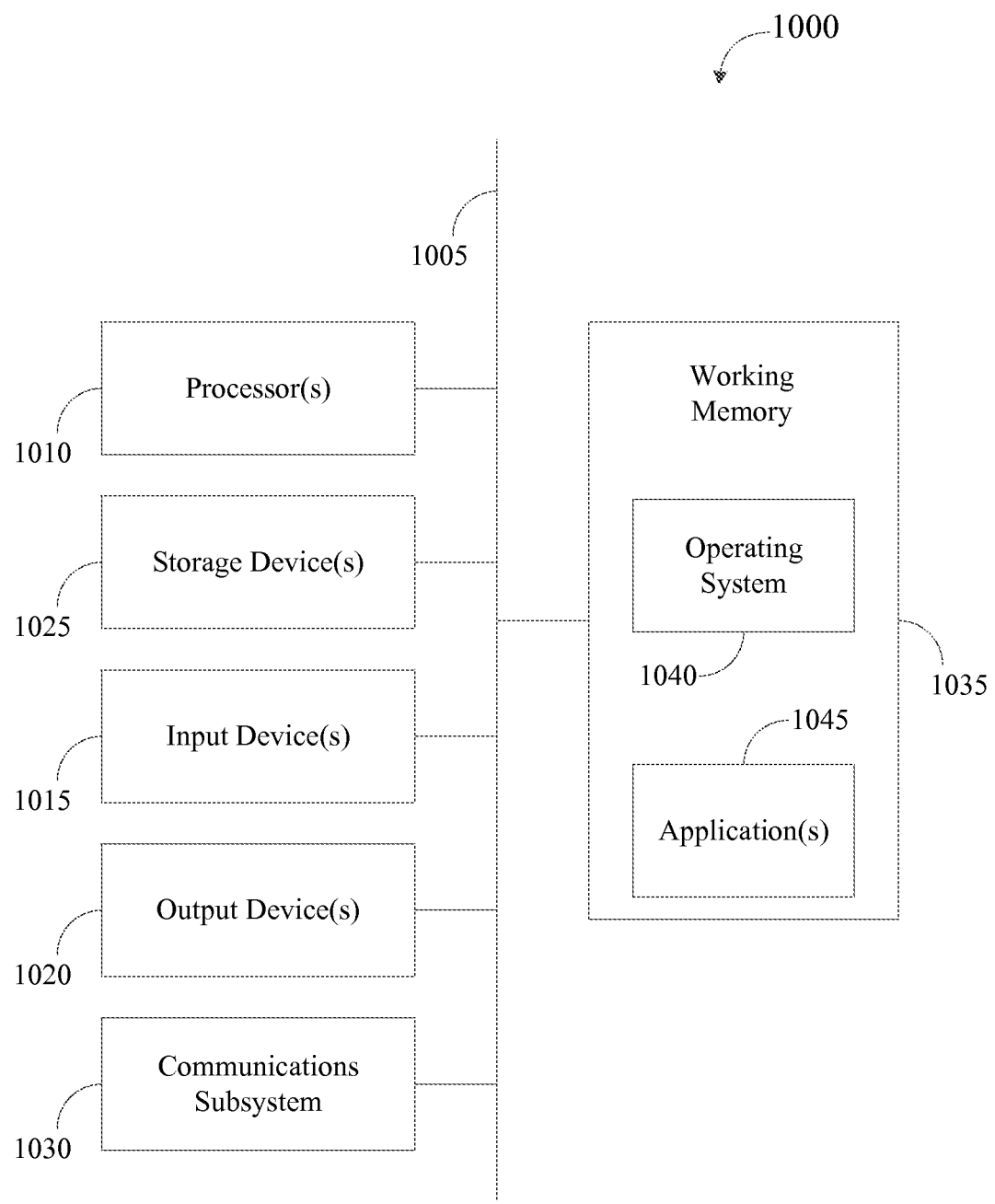
FIG. 10 shows an illustrative computational system for performing functionality to facilitate implementation of embodiments described herein.

The computational system 1000, shown in FIG. 10 can be used to perform any of the embodiments of the invention. For example, computational system 1000 can be used to execute all or part of methods 200, 400, 500, 600, 800, and/or 900. As another example, computational system 1000 can be used perform any calculation, identification and/or determination described here. Computational system 1000 includes hardware elements that can be electrically coupled via a bus 1005 (or may otherwise be in communication, as appropriate). The hardware elements can include one or more processors 1010, including without limitation one or more general-purpose processors and/or one or more special-purpose processors (such as digital signal processing chips, graphics acceleration chips, and/or the like); one or more input devices 1015, which can include without limitation a mouse, a keyboard and/or the like; and one or more output devices 1020, which can include without limitation a display device, a printer and/or the like.

The computational system 1000 may further include (and/or be in communication with) one or more storage devices 1025, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1000 might also include a communications subsystem 1030, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 1030 may permit data to be exchanged with a network (such as the network described below, to name one example), and/or any other devices described herein. In many embodiments, the computational system 1000 will further include a working memory 1035, which can include a RAM or ROM device, as described above.

The computational system 1000 also can include software elements, shown as being currently located within the working memory 1035, including an operating system 1040 and/or other code, such as one or more application programs 1045, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above.

In some cases, the storage medium might be incorporated within the computational system 1000 or in communication with the computational system 1000. In other embodiments, the storage medium might be separate from a computational system 1000 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.) then takes the form of executable code.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method for developing a combined ontology, wherein the method includes one or more processing devices performing operations comprising:
    obtaining, by executing a web crawler algorithm, data about a website;
    creating, in a memory storage device, a data structure storing the obtained data, wherein the data structure comprises a domain matrix A having (i) rows representing respective webpages identified in the obtained data and (ii) columns representing terms included in the webpages of the website;
    transforming the data structure into a second data structure with a reduced size and representative of the terms and the webpages, wherein transforming the data structure into a second data structure comprises:

computing column importance scores for the columns of the domain matrix A, creating a matrix C from a subset of the columns having a first subset of the column importance scores, wherein each of the first subset of the column importance scores is greater than each of a second subset of the column importance scores for other columns of the domain matrix A excluded from the subset of the columns, computing row importance scores for the rows of the domain matrix A, generating the second data structure by performing a matrix multiplication of the matrix C, a matrix U, and a matrix R that is generated from the row importance scores of the domain matrix A;

applying an ontology-generation algorithm to the second data structure, the ontology-generation algorithm comprising:

identifying a plurality of terms from each web page included in at least the second data structure based on predefined part-of-speech patterns;

extracting, from each webpage included in at least the second data structure, a plurality of collocations that are sequences of terms that occur together more than once within the webpages included in the second data structure;

computing a term frequency for the webpages of the website selecting, from the second data structure, a set of the webpages with maximized similarity and a subset of webpages with maximized diversity;

selecting a sampled set of webpages, wherein the sampled set of webpages is one or more of:

a subset of the set of the webpages with maximized similarity that is selected based on a Jaccard Index; and a subset of the set of the webpages with maximized diversity that is selected based on a Kullback-Leibler coefficient;

creating a first ontology based on, for each webpage of the sampled set of webpages included in the second data structure, semantic relationships between terms in the webpage based on the term frequency;

creating a second ontology based on a statistical analysis of the plurality of collocations, the statistical analysis being different from a semantic analysis for determining the semantic relationships; and creating an aggregated ontology by combining the first ontology and the second ontology, the aggregated ontology indicating a hierarchy of categories that include topics present within the website.

2. The method of claim 1, further comprising creating a third ontology from the plurality of collocations extracted for each webpage included in at least the second data structure, wherein the third ontology is created using a different process than the first ontology and the second ontology; and wherein creating the aggregated ontology includes combining the first ontology, the second ontology, and the third ontology.

3. The method of claim 1, wherein identifying the plurality of terms from each web page included in at least the second data structure based on predefined part-of-speech patterns comprises tagging a part-of-speech of each term within each webpage.

4. The method of claim 1, wherein creating either the first ontology or creating the second ontology further comprises performing an analysis on the plurality of collocations extracted for each webpage included in at least the second data structure by performing an is-a relation analysis on the terms on the webpage.

5. The method of claim 1, wherein extracting the plurality of collocations for each webpage included in at least the second data structure further comprises:

identifying part-of-speech patterns within each webpage based on the predefined part-of-speech patterns; and calculating likelihood ratios for each identified part-of-speech pattern.

6. The method of claim 1, wherein extracting the plurality of collocations for each webpage included in at least the second data structure further comprises:

identifying collocations with specific part-of-speech-patterns within each webpage included in at least the second data structure based on the predefined part-of-speech patterns;

calculating likelihood ratios for each identified part-of-speech pattern;

testing all n-grams within each identified part-of-speech pattern to determine a most likely n-gram within the identified part-of-speech pattern; and replacing the identified part-of-speech with the most likely n-gram.

7. The method of claim 1, wherein calculating an importance metric further comprises calculating:

$$\pi_j = \frac{1}{k}\sum_{\tau=1}^{k}(v_j^\tau)^2$$

where $v_j^\tau$ is a $j^{th}$ coordinate of an $\tau^{th}$ right singular vectors of the domain matrix A, and k is a rank parameter.

8. A computing system comprising:

a processing device;

a memory device communicatively coupled to the processing device; and a non-transitory computer-readable medium communicatively coupled to the processing device and embodying program components, wherein the processing device is configured for executing the program components and thereby causing the computing system to:

identify, from obtained data describing a website, a plurality of webpages included in the website;

identify a plurality of terms on each webpage of the plurality of webpages based on predefined part-of-speech patterns;

create, in the memory device, a data structure for storage of the obtained data, wherein the data structure comprises a matrix A having (i) rows representing respective webpages identified in the obtained data and (ii) columns representing the plurality of terms included on the webpages;

extract a plurality of collocations from each webpage based at least in part on the plurality of terms, wherein the plurality of collocations are sequences of terms that occur together more than once within the plurality of webpages;

transform the data structure into a second data structure with a reduced size and representative of the terms and the webpages, wherein the second data structure comprises:

column importance scores for the columns of the matrix A, a matrix C created from a subset of the columns of the matrix A having a first subset of the column importance scores, wherein each of the first subset of the column importance scores is greater than each of a second subset of the column importance scores for other columns of the matrix A excluded from the subset of the columns, a matrix R that is generated from row importance scores of the matrix A, and a matrix multiplication of the matrix C, a matrix U, and the matrix R;

create a first ontology based on a semantic analysis of the plurality of collocations, wherein the semantic analysis of the plurality of collocations comprises, for each webpage:

identifying semantic relationships between words within the webpage;

computing a term frequency for the webpages of the website;

selecting, from the second data structure, a set of the webpages with maximized similarity and a subset of webpages with maximized diversity;

selecting a sampled set of webpages, wherein the sampled set of webpages is one or more of:

a subset of the set of the webpages with maximized similarity that is selected based on a Jaccard Index; and a subset of the set of the webpages with maximized diversity that is selected based on a Kullback-Leibler coefficient; and creating the first ontology based at least in part on the semantic relationships between the words and the term frequency;

create a second ontology based on a statistical analysis of the plurality of collocations, the statistical analysis being different from the semantic analysis; and create an aggregated ontology by combining the first ontology and the second ontology, the aggregated ontology indicating a hierarchy of categories that include topics present within the website.

9. The computer system according to claim 8, wherein the computing system is further configured to:

identify part-of-speech patterns within each webpage of the webpages based on the predefined part-of-speech patterns;

calculate likelihood ratios for each identified part-of-speech pattern;

test all grams within each identified part-of-speech pattern to determine a most likely n-gram within the identified part-of-speech pattern; and replace the identified part-of-speech with the most likely n-gram, to extract the collocations for each webpage within the website.

10. The computing system of claim 8, wherein calculating an importance metric further comprises calculating:

$$\pi_j = \frac{1}{k}\sum_{\tau=1}^{k}(v_j^\tau)^2$$

where $v_j^\tau$ is a $j^{th}$ coordinate of an $\tau^{th}$ right singular vectors of matrix A, and k is a rank parameter.

11. The computing system of claim 8, wherein identifying the matrix C further comprises:

calculating an importance metric for each column in the matrix A; and selecting columns from the matrix A having a high importance metric.

12. The method of claim 1, wherein identifying the matrix C further comprises:

calculating an importance metric for each column in the domain matrix A; and selecting columns from the domain matrix A having a high importance metric.

13. The method of claim 1, further comprising:

receiving a number, n, representing a number of columns of matrix C; and receiving a number, m, representing a number of rows of matrix R;

wherein creating the matrix C from the columns of the domain matrix A, comprises selecting n columns from the domain matrix A for the matrix C; and wherein creating the matrix R from the rows of the domain matrix A, comprises selecting m columns from the domain matrix A for the matrix R.

14. The method of claim 1, wherein the rows include actual webpage documents from the website.

15. A computer program product comprising a non-transitory computer-readable medium embodying program code executable by a processing device, wherein the program code, when executed by the processing device causes the processing device to perform operations comprising:

obtaining, by executing a web crawler algorithm, data about a website;

creating, in a memory storage device, a data structure storing the obtained data, wherein the data structure comprises a domain matrix A having (i) rows representing respective webpages identified in the obtained data and (ii) columns representing terms included in the webpages of the website;

transforming the data structure into a second data structure with a reduced size and representative of the terms and the webpages, wherein transforming the data structure into the second data structure comprises:

computing column importance scores for the columns of the domain matrix A, creating a matrix C from a subset of the columns having a first subset of the column importance scores, wherein each of the first subset of the column importance scores is greater than each of a second subset of the column importance scores for other columns of the domain matrix A excluded from the subset of the columns, and generating the second data structure by performing a matrix multiplication of the matrix C, a matrix U, and a matrix R that is generated from importance scores of the rows of the domain matrix A;

applying an ontology-generation algorithm to the second data structure, the ontology-generation algorithm comprising:

identifying a plurality of terms from each web page included in the second data structure based on predefined part-of-speech patterns;

extracting, from each webpage included in the second data structure, a plurality of collocations that are sequences of terms that occur together more than once within the webpages included in the second data structure;

computing a term frequency for the webpages of the website;

selecting, from the second data structure, a set of the webpages with maximized similarity and a subset of webpages with maximized diversity;

selecting a sampled set of webpages, wherein the sampled set of webpages is one or more of:
 a subset of the set of the webpages with maximized similarity that is selected based on a Jaccard Index; and
 a subset of the set of the webpages with maximized diversity that is selected based on a Kullback-Leibler coefficient;

creating a first ontology based on, for each webpage of the sampled set of webpages included in the second data structure, semantic relationships between terms in the webpage based on the term frequency;

creating a second ontology based on a statistical analysis of the plurality of collocations, the statistical analysis being different from a semantic analysis for determining the semantic relationships; and creating an aggregated ontology by combining the first ontology and the second ontology, the aggregated ontology indicating a hierarchy of categories that include topics present within the website.

16. The computer program product of claim 15, further comprising program code that causes the processing device to tag a part-of-speech of each word within each webpage.

17. The computer program product of claim 15, wherein creating either the first ontology or the second ontology comprises program code performing an is-a relation analysis on the terms on each webpage.

18. The computer program product of claim 15, wherein extracting the plurality of collocations for each webpage within the website further comprises:
 identifying part-of-speech patterns within each webpage of the webpages based on predefined part-of-speech patterns; and calculating likelihood ratios for each identified part-of-speech pattern.

* * * * *